Feb. 14, 1950    J. N. KEBOUR    2,497,733
PRECISION LAYOUT GAUGE FOR DRILL GUIDES
Filed April 17, 1948
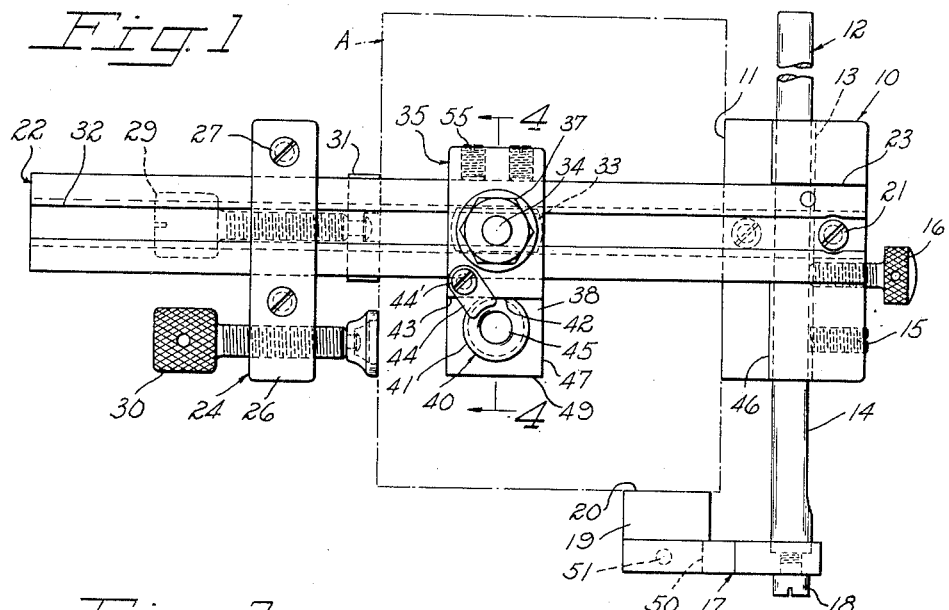
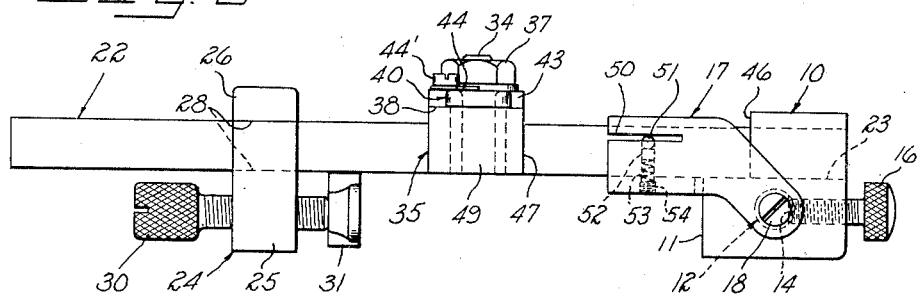
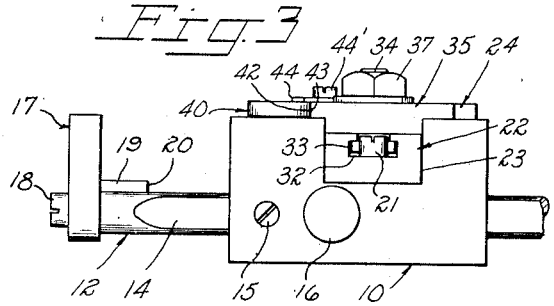 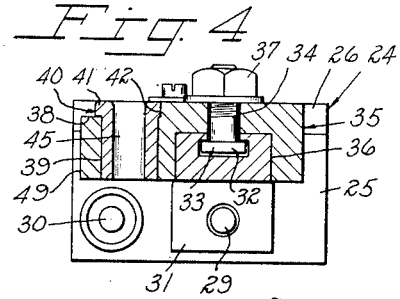
Inventor
JOSEPH N. KEBOUR
By Lindsey, Prutzman & Just
Attorneys Patented Feb. 14, 1950

2,497,733

UNITED STATES PATENT OFFICE 2,497,733

PRECISION LAYOUT GAUGE FOR DRILL GUIDES

Joseph N. Kebour, Hartford, Conn.

Application April 17, 1948, Serial No. 21,622

6 Claims. (Cl. 77—62)

The present invention relates to a jig for facilitating the accurate locating and drilling of holes in a workpiece, and more particularly to a jig having a drill guide member which can be positioned quickly, easily and accurately closely adjacent the surface of the workpiece and spaced in predetermined measured distance from the side edges of the workpiece.

It is an object of the invention to provide a jig which is extremely accurate in use so that the positioning of a drill for boring holes in a workpiece can be carried out precisely within close tolerances.

A further object of the invention is to provide such an accurately functioning jig which can be adjusted easily and quickly with a minimum of effort. In connection with this object, it is an aim to provide a jig which may be utilized for positioning a drill at a plurality of places in sequence with a minimum of adjustments of the jig.

A further object of the invention is to provide a versatile jig of the character described which is of simple and economical construction and which is made from a minimum of inexpensive parts so that the same may be manufactured at a reasonable cost and will not be cumbersome and unwieldly in use.

A further object of the invention is to provide a jig of this type which may be used with a wide variety of types of workpieces and which is foolproof in operation and will not readily get out of adjustment.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1 is a plan view of a specific embodiment of the jig as mounted on a workpiece;

Fig. 2 is a front view of the jig;

Fig. 3 is an end view of the jig; and

Fig. 4 is a cross sectional view taken along the line 4—4 of Fig. 1.

Referring to the drawings, the specific embodiment of a jig of the present invention is shown as affixed to a workpiece A of generally rectangular outline, the latter being shown merely diagrammatically by dash and dot lines. It is an advantage of the present invention that the thickness of the workpiece A is not critical as the jig will be effective with all types of workpieces ranging from thin sheets to relatively large blocks.

For the purpose of engaging one side of the workpiece A, there is provided a block 10 of any convenient size having a flat inner surface 11 adapted to abut against one side edge of the workpiece A.

Slidably extending through a bore 13 in the block 10 substantially parallel to the flat surface 11 is an elongated rod 12. In order to prevent turning of the rod 12 in the embodiment shown, since the rod 12 is generally circular in cross section, there is provided on the rod 12 a flat surface 14 which is adapted to be engaged by the set screw 15 and thumb screw 16. The set screw 15 is not turned tightly against the rod 12 and serves merely to prevent turning of the rod without interfering with its sliding movement. The thumb screw 16, however, is utilized to lock the block 10 on the elongated rod 12 at any desired position.

At the front end of the rod 12 there is secured an arm 17 as, for example, by means of screw 18, the arm 17 being substantially at right angles to the rod 12 and extending to the front of the workpiece A. A flange 19 on the arm 17 having a forward edge 20 perpendicular to the flat surface 11 of the block 10 is adapted to engage the front edge of the workpiece A.

Secured at one end to the block 10 as by means of screws 21 is an elongated bar 22 of rectangular cross section which, for convenience in assembly and for other reasons mentioned hereinafter, is received within a slot 23 in the block 10. The bar 22 extends perpendicularly to the flat surface 11 and is adapted to rest upon the upper surface of the workpiece A.

At the opposite end of the bar 22 there is positioned a clamp 24 comprising a U-shaped plate 25 extending underneath and upwardly along the sides of the bar 22 and provided with a bar 26 extending across the top of the U-shaped plate 25 and secured thereto by screws 27. The space 28 (as indicated in Fig. 2) between the bar 26 and plate 25 is slightly smaller than the height of the bar 22 so that by tightening the screws 27 the clamp 24 can be locked to the bar 22 at any desired position.

Extending through the plate 25 are a pair of set screws 29 and 30 for securing the jig to the adjacent side edge of the workpiece A. The set screw 29 is rotatably journaled at its inner end in a pressure plate or shoe 31 which is rectangular in shape and which, by engagement with the undersurface of the bar 22, is prevented from turning. By reason of the close engagement of the pressure plate 31 with a bar 22 as well as the solid corner afforded by the juncture of the bar 22 and block 10, it will be appreciated that even very thin workpieces may be securely engaged by the jig. The thumb screw 30 is in a sense an auxiliary setting member and it has rotatably fixed to its inner end a conventional swivel head which also is adapted to engage the outer edge of the workpiece A.

The bar 22 is provided in its upper surface and throughout its entire length with a T-slot 32 into which is received the head 33 of a bolt 34 which extends upwardly through a slide 35 which is movably positioned on the bar 22 between the block 10 and the clamp 24. The slide 35 is provided with a rectangular slot 36 whereby the slide is adapted to fit snugly over the top and sides of the bar 22. A nut 37 on the bolt 34 permits the slide to be locked to the bar 22 at any desired position. The set screws 55 (see Fig. 1) on the slide 35 are provided merely to take up any wear in the slot 36 of the slide 35 so that the slide 35 will remain firmly positioned on the bar 22.

The forward end of the slide 35 is recessed at 38 and a vertical bore 39 therethrough is adapted to receive a drill guiding member such as the bushing 40. The bushing 40 has a flange or lip 41 at the top thereof for engaging the upper surface of the recess 38. This lip 41 has a flattened portion 42 for engaging the rearward edge 43 of the recess 38 to prevent the bushing from turning. A keeper 44 pivoted at screw 44' is provided to releasably engage the lip 41 to retain the bushing 40 in the position shown. The inner bore 45 of the bushing 40 is of the size of the drill which it is desired to utilize. It is intended that a supply of bushings will be provided, all having the same external dimensions so as to fit in the bore 39 but the bushings being of varying thickness, i. e., of varying internal diameter, so as to provide any desired bore 45 to accommodate the various drill sizes. Inasmuch as the bushing 40 extends all the way through the slide 35 which, in turn, rests upon the top of the workpiece A, it will be appreciated that the drill will be precisely guided by the bushing 40 to the desired point on the workpiece.

It will be appreciated from the foregoing description that the fixing of the position of a drill hole in the workpiece will be accomplished by adjusting the position of the block 10 on the rod 12 and then selecting the desired position of the slide 35 on the bar 22. To facilitate these settings, there has been provided in accordance with the invention a shoulder 46 in the block 10 which is set back from the flat surface 11 a distance equal to that from the center of the bushing 40 to the side edge 47 of the slide 35. As a result, the operator may accurately position the center of the bushing 40 from the side edge of the workpiece A, i. e., from the flat surface 11 of the block 10 merely by gauging the distance between the shoulder 46 and the edge 47 of the slide 35. This may be done, for example, by utilizing a micrometer or by inserting a standard size block. Also, if desired, the same result may be approximated by placing an ordinary steel rule along the top of the bar 22 from the inner edge 47. Because of the slot 23 whereby the top of the bar 22 is slightly recessed below the upper surface of the block 10, the rule will extend outwardly across the block 10 and it is relatively easy to accurately determine the reading on the scale at the shoulder 46.

In order to facilitate the accurate positioning of the block 10 on the rod 12, the width of the flange 19 has been made of exactly the same size as the distance from the center of the bushing 40 to the forward edge 49 of the slide 35. As a result, the positioning of the block 10 may be determined very readily by a measurement of the distance between the arm 17 and the forward edge 49 of the slide 35. As in the case of the lateral position of the slide 35, this may be done, for example, by the use of a micrometer or by using standard space blocks. If it is desired to utilize a steel rule for this measurement, there may be provided in accordance with the invention a slot 50 in the arm 17 through which the steel rule may be extended which not only eliminates the need for the operator to hold the rule but also facilitates the reading of the distance on the scale of the rule. A small plunger 51 in a bore 52 may be provided to engage the rule to facilitate its positioning in the slot 50, the plunger 51 being urged upwardly by a spring 53 held in place by retaining screw 54.

The size of the jig may be varied over a wide range depending on the type of workpieces with which the jig is to be utilized. It will also be appreciated that the rod 12 may be inserted from the opposite end if desired to make the jig effective for measurements from the rear edge of the workpiece A. This may be desired, for example, in case the specific jib being utilized is not of sufficient size to cover a series of holes extending from front to rear of the workpiece A.

The jig has particular utility in the boring of a line of holes in a workpiece since this necessitates the changing of only one setting of the jig to complete the entire line and in the case of the setting of the slide 35 this may be accomplished without detaching the jig or loosening its grasp on the workpiece A.

With a jig constructed and arranged as described above, it is possible to accurately and quickly locate the drill holes and guide the drill for a plurality of drill holes in a workpiece, as desired. As will be apparent, the location of the holes will be extremely accurate to the full capabilities of the measuring devices utilized and there is little likelihood that errors will be made in the use of the jig. Along with all the functional advantages of the jig, the same is of simple and economical construction and can be manufactured and sold at low cost, and at the same time the jig is of rugged construction and will not require repair or replacement over long periods of use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A jig comprising a block having a flat side for engaging one side edge of a workpiece, an elongated bar of rectangular cross section fixed at one end to the block for extension perpendicularly from said flat side across the top surface of the workpiece, adjustable means on the bar for engaging the opposite side edge of the workpiece, a slide in the form of a block having a rectangular recess of substantially the same depth and thickness as the bar engaging the top and side edges of the bar, means for locking the slide in selected position longitudinally of the bar, a drill guiding member mounted in the slide extending upwardly from the bottom of the slide and spaced from the bar, and means for spacing the block a selected distance from the front edge of the workpiece comprising a rod slidably attached to the block having an extension for engaging the front edge of the workpiece and means for locking the block on the rod.

2. A jig comprising a block having a flat side for engaging one side edge of a workpiece, an elongated bar of rectangular cross section fixed at one end to the block perpendicular to the flat side thereof and adapted to overlie the workpiece, adjustable means on the bar for engaging the opposite side edge of the workpiece, a slide on the bar and movable longitudinally thereon having a rectangular recess fitting around the bar, said bar having a longitudinally extending T slot in its upper surface and said slide having adjustable fastening means engaging the slot to permit locking of the slide in selected position on the bar, a drill guiding bushing carried by the slide, and means for spacing the bar from the front edge of the workpiece comprising a rod slidably extending through the block at right angles to the bar having a projection for engaging the front edge of the workpiece, means for preventing turning of the rod, and means for locking the block on the rod.

3. A jig comprising a block having a flat side for engaging one side edge of a workpiece, an elongated bar having parallel sides and a top surface perpendicular to the sides fixed at one end to the block, said bar being perpendicular to said flat side and adapted to overlie the workpiece, adjustable means on the bar for engaging the opposite side edge of the workpiece, a slide having front and side edges of generally rectangular outline having a rectangular recess slidably engaging the side and top surfaces of the bar, means for adjusting the engagement with the sides of the bar to maintain the side edges of the slide perpendicular to the bar, a drill guiding bushing carried by the slide having its center spaced from the front and side edges of the slide, a setback in the block at the flat side thereof having a width corresponding to the distance between the center of the drill guiding bushing and the adjacent side edge of the slide, and means for fixing the position of the bar from the front edge of the workpiece comprising a rod slidably extending through the block at right angles to the bar having a projection for engaging the front edge of the workpiece, and means for locking the block on the rod.

4. A jig comprising a block having a flat side for engaging one side edge of a workpiece, an elongated bar fixed at one end to the block perpendicular to said flat side and adapted to overlie the workpiece, said bar being of rectangular cross section, adjustable means on the bar for engaging the opposite side edge of the workpiece, a slide having portions engaging the top and sides of the bar and movable longitudinally of the bar, said slide having a front and a side edge perpendicular and parallel, respectively, to said flat side of the block, a removable bushing carried by the slide having its center spaced from the front and side edges of the slide, a shoulder on the block parallel to the flat side of the block and spaced from the flat side at a distance equal to the distance between the center of the bushing and said side edge of the slide, and means for fixing the position of the bar from the front edge of the workpiece comprising a rod slidably extending through the block at right angles to the bar, a projection on the rod having a flange for engaging the front edge of the workpiece, the width of said flange being equal to the distance between the center of the bushing and front edge of the slide, and means for locking the block on the rod.

5. A jig comprising a block having a flat side for engaging one side edge of a workpiece, an elongated bar of generally rectangular cross section fixed at one end to the block perpendicular to the flat side thereof and adapted to overlie the workpiece, a first slide having a rectangular opening through which the bar extends and arranged to be clamped in a selected longitudinal position on the bar, means carried by the first slide for engaging the opposite side of the workpiece comprising a screw extending through the slide and a rectangular shoe resting against the undersurface of the bar to which the screw is rotatably fixed, a second slide of generally U-shaped cross section overlying the top and sides of the bar and disposed on the bar intermediate the first slide and the block, means for locking the second slide in selected longitudinal position on the bar, drill guiding means carried by the second slide and spaced from the bar, said second slide having a side edge facing the block and parallel thereto and a front edge perpendicular thereto, a shoulder on the block spaced from its flat side at a distance equal to the distance from the center of the drill guiding means to said side edge of the said second slide, and means for fixing the position of the bar relative to the front edge of the workpiece comprising an elongated rod slidably extending through the block at right angles to the bar, a projection on the rod parallel to the bar having an edge for engaging the front edge of the workpiece, a shoulder on said projection parallel to the bar and spaced from the engaging edge at a distance equal to the distance from the center of the drill guiding means to the front edge of the second slide, means for preventing rotation of the rod, and means for locking the block on the rod.

6. A jig comprising a block having a flat side for engaging one side edge of a workpiece and having a rectangular slot in its upper surface at right angles to said side, an elongated bar of generally rectangular cross section fixed at one end in said slot with its upper surface indented with respect to the upper surface of the block and having a longitudinally extending T slot therein, a first slide on the bar having a rectangular aperture through which the bar extends, means for decreasing said aperture to clamp the slide on the bar, a set screw carried by the clamp for engaging the opposite side edge of the workpiece, a U-shaped slide on the bar engaging the top and sides of the bar having a rectangular portion at the front edge of the bar, said rectangular portion having a side edge parallel to the block and a front edge parallel to the bar, a removable bushing in said portion spaced from the edges thereof, means for locking the U-shaped slide on the bar comprising a bolt carried by the slide engaging in said T-slot, a shoulder on the block spaced from the flat side thereof at a distance equal to the distance from the center of the bushing to the adjacent side edge of the U-shaped slide, and means for fixing the position of the bar relative to the front edge of the workpiece comprising an elongated rod slidably extending through the block at right angles to the bar, a flat side on said rod adapted to be engaged to prevent turning of the rod, a projection on the rod parallel to the bar having an edge for engaging the front edge of the workpiece, a shoulder on said projection spaced from the engaging edge at a distance equal to the distance from the center of the bushing to the front edge of the U-shaped slide, a rule receiving slot in said shoulder, and means for locking the block on the rod.

JOSEPH N. KEBOUR.

REFERENCES CITED

The following references are of record in the file of this patent:

UNITED STATES PATENTS

| Number | Name | Date |
|---|---|---|
| 581,811 | Coyle | May 4, 1897 |
| 809,069 | Lovett | Jan. 2, 1906 |
| 1,161,479 | Kelley | Nov. 23, 1915 |
| 1,210,942 | Jones | Jan. 2, 1917 |
| 1,269,811 | Heritage | June 18, 1918 |
| 1,861,289 | Abramson | May 31, 1932 |
| 2,240,230 | Schlichting | Apr. 29, 1941 |
| 2,268,930 | Edwards | Jan. 6, 1942 |
| 2,367,582 | Honyoust | Jan. 16, 1945 |